United States Patent [19]
Hodgkinson

[11] 3,794,000
[45] Feb. 26, 1974

[54] FUEL SYSTEM FOR SEPARATING VOLATILE FUEL FROM GASOLINE

[75] Inventor: Raymond E. Hodgkinson, Seabrook, Tex.

[73] Assignee: Ethyl Corporation, Richmond, Va.

[22] Filed: Sept. 17, 1971

[21] Appl. No.: 181,415

[52] U.S. Cl......... 123/133, 123/122 A, 123/122 E, 123/127, 123/179 G
[51] Int. Cl. .................................................. F02m 15/00
[58] Field of Search ....... 123/2, 3, 179 G, 127, 133, 123/134; 196/98; 208/104, 356, 359, 381, 388

[56] References Cited
UNITED STATES PATENTS

| | | | |
|---|---|---|---|
| 3,688,755 | 9/1972 | Grayson et al. | 123/127 |
| 1,576,766 | 3/1926 | Kloepper | 123/127 |
| 1,477,860 | 12/1923 | Adams | 196/98 |
| 1,613,718 | 1/1927 | Parmelee | 196/98 |
| 3,021,681 | 2/1962 | Perry | 123/133 |
| 1,744,953 | 1/1930 | Dienner | 123/127 |
| 1,559,214 | 10/1925 | Woolson | 123/127 |

Primary Examiner—Laurence M. Goodridge
Attorney, Agent, or Firm—Donald L. Johnson; Robert A. Linn; Joseph D. Odenweller

[57] ABSTRACT

A dual fuel system for a gasoline-fueled internal combustion engine wherein the volatile portion of gasoline is vaporized in a chamber, compressed and condensed into a tank positioned within the vaporizing chamber whereby the heat of condensation is utilized to aid vaporization and any leaks in the tank are safely contained in the vaporizing chamber. The condensed volatile portion of the gasoline is delivered to the engine during start and warm-up and gasoline is delivered the remainder of the time. Means are provided to vent the vaporizing chamber and drain the volatile-depleted fuel to the gasoline line. Operation in this manner reduces exhaust hydrocarbon and carbon monoxide emissions.

13 Claims, 2 Drawing Figures

PATENTED FEB 26 1974 3,794,000

FUEL SYSTEM FOR SEPARATING VOLATILE FUEL FROM GASOLINE

BACKGROUND

The exhaust gas of internal combustion engines contains various amounts of unburned hydrocarbons, carbon monoxide, and nitrogen oxides ($NO_x$). Emission of these materials to the atmosphere is undesirable. The problem is more acute in urban areas having a high concentration of motor vehicles.

During recent years, researchers have investigated extensively means of reducing exhaust emission. This research has been quite fruitful. As a result, present-day automobiles emit but a fraction of undesirable materials compared to those of less than a decade ago. These improved results have come about through such means as improved carburetion, ignition timing modification, exhaust recycle, exhaust manifold air injection, use of lean air/fuel ratios, positive crankcase ventilation, and the like.

Despite the tremendous advances that have been made, further improvements are desirable. Federal standards by 1975 are expected to require reduction of emissions to only about ten percent of the level of 1970. A major obstacle in achieving further reduction in exhaust emissions is the fact that the engine requires a richer air/fuel mixture during start and warm-up. During this period exhaust emissions of even the lowest emitting engine is appreciably increased. In the case of carburetor induction engines the required richer air/fuel mixture is usually attained by placing a choke valve in the air passage above the carburetor venturi, which serves to restrict air flow. In most, but not all, gasoline powered vehicles the choke is automatically controlled by engine temperature. As soon as the engine reaches an adequate operating temperature (i.e., a temperature at which it can operate smoothly without choking) the choke opens. In normal operation this takes about 2–3 minutes.

In the past, attempts have been made to eliminate the need for this rich operating warm-up period by operating the engine on liquid petroleum gas (LPG) during the warm-up period and switching to gasoline after operating temperature is attained. A drawback of this system is that it requires the vehicle operator to obtain two different kinds of fuel--gasoline and LPG. Of even greater consequence is the fact that the use of a liquid and a gaseous fuel requires a separate metering system for each fuel. For example, the LPG fuel system is separate from the gasoline fuel system and provides LPG vaporization, pressure regulation and, finally, vapor induction into the intake air stream through a separate metering jet. Because of this, the system using LPG fuel is considered impractical.

An object of the present invention is to provide a fuel induction system that results in lower exhaust emissions. A further object is to provide a fuel induction system that allows an engine to start and warm-up without the necessity of operating the engine at a rich air/fuel ratio. A still further object of the invention is to provide a dual liquid fuel system with self-generation of the more volatile liquid fuel from the normal gasoline fuel, thus eliminating the necessity of the vehicle operator obtaining two separate fuels. A further object is to provide a means of storing the volatile liquid fuel under pressure in a safe manner. Another object is to provide a method of operating a gasoline engine in a manner that will result in reduced exhaust emissions.

SUMMARY

The invention comprises a dual fuel system in which a volatile fuel is vaporized from gasoline in a vaporizing chamber and after condensation is stored under pressure in a storage tank located within the vaporizing chamber. The system delivers either the condensed volatile fuel or gasoline to the fuel induction system during selected periods of operation. During start and warm-up the more volatile fuel is used and subsequently the system switches to normal gasoline. In this manner, choking is avoided, leading to reduced hydrocarbon and carbon monoxide emission. Another feature of the invention is the means provided to vent the vaporizing chamber, thus enabling the volatile-depleted fuel therein to be drained to the gasoline line and used to operate the engine in place of gasoline or mixed with gasoline during selected periods of engine operation such as when the engine is at full operating temperature.

DESCRIPTION OF THE PREFERRED EMBODIMENTS

Figure 1:
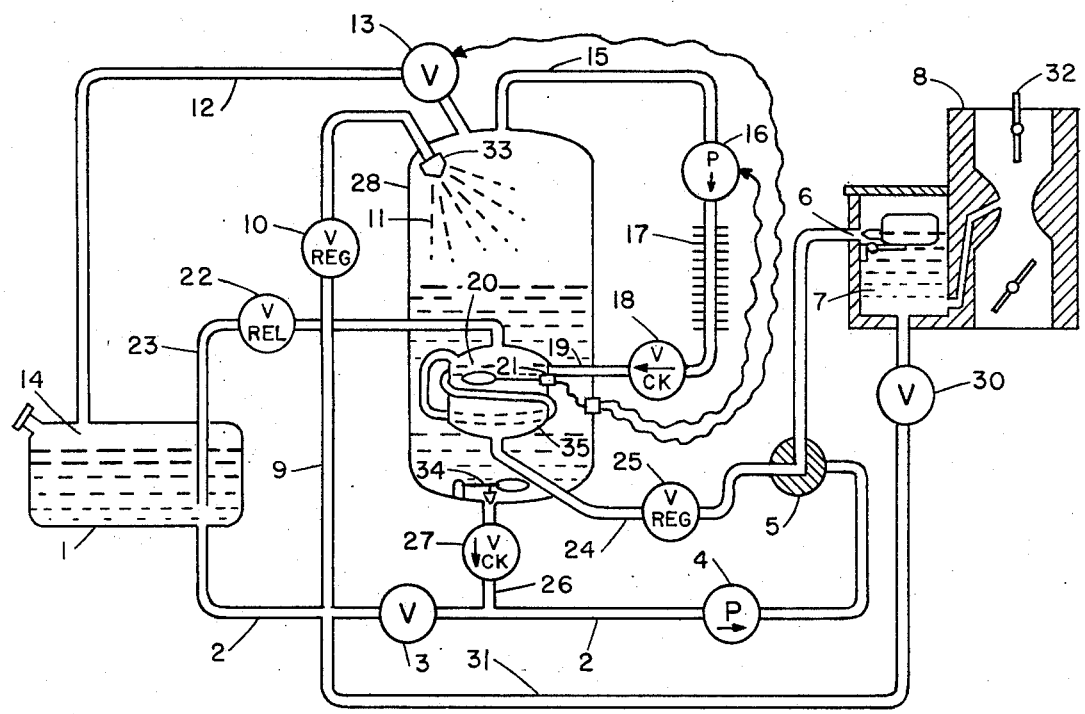
FIG. 1 is a schematic of the fuel system showing the normal gasoline tank, vaporizing chamber, pressure storage tank, and a cross-section of a typical carburetor including the various conduits used to deliver the dual fuels and also the positioning of the pressure storage tank inside the vaporizing chamber.

The embodiment shown in FIG. 1 includes a gasoline tank 1 for normal gasoline connected by gasoline conduit 2 through valve 3, fuel pump 4 and fuel switching valve 5 to the fuel inlet 6 of the fuel bowl 7 of carburetor 8, which is mounted on the intake manifold of an internal combustion engine (not shown). Gasoline tank 1 connects through gasoline conduit 2, second gasoline conduit 9, pressure regulating valve 10 and spray nozzle 33 to vaporizing chamber 11 formed by outer housing 28. The top of chamber 11 connects through an end closure by vent conduit 12 and vent valve 13 to the upper vapor area 14 of gasoline tank 1. The top of chamber 11 also connects through its top end closure by vapor conduit 15 to pump 16. The compressor side of pump 16 connects by finned-condenser conduit 17, one-way check valve 18 and conduit 19 through the side wall of chamber 11 to pressure storage tank 20 formed by inner housing 35 located within chamber 11. Conduit 19 coils around tank 20 to provide additional heat exchange area. Inside tank 20 is liquid level actuated switch 21. The top of tank 20 connects through pressure relief valve 22 and conduit 23 which passes through the side wall of chamber 11 to the bottom liquid zone of gasoline tank 1. The bottom of tank 20 connects through condensate conduit 24, pressure regulating valve 25 and fuel switching valve 5 to fuel inlet 6. Fuel switching valve 5 is schematically shown to form a flow path through condensate conduit 24 to fuel inlet 6. In its other position, obtained by rotating the valve member 90° clockwise, a flow path is formed through gasoline conduit 2 to fuel inlet 6. Drain conduit 26 connects chamber 11 through its bottom closure through one-way check valve 27 to gasoline conduit 2. Float actuated valve 34 closes the drain whenever the liquid level in chamber 11 drops below a predetermined level. This level may be almost empty or it may be a level sufficient to maintain tank 20 immersed in volatile-depleted gasoline.

Fuel bowl 7 connects through carburetor drain valve 30 and conduit 31 to gasoline conduit 2.

Figure 2:
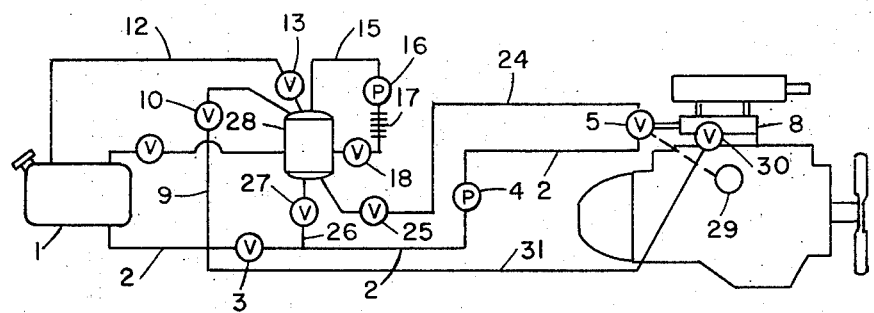
FIG. 2 shows the fuel system connected to an internal combustion engine.

FIG. 2 shows the fuel system installed to deliver both gasoline and volatile condensate to an internal combustion engine utilizing only normal gasoline as the fuel source.

Normal gasoline is a liquid mixture of hydrocarbons having a boiling range of from about 80°F. to about 430°F., as measured by ASTM Method D-86. Of course, these mixtures contain individual components boiling above or below these figures. These hydrocarbon mixtures contain aromatic hydrocarbons, saturated hydrocarbons and olefinic hydrocarbons. The bulk of the hydrocarbon mixture is obtained by refining crude petroleum by either straight distillation or through the use of one of the many known refining processes, such as thermal cracking, catalytic cracking, catalytic hydroforming, catalytic reforming, and the like. Generally, the final gasoline is a blend of stocks obtained from several refinery processes. The final blend may also contain hydrocarbons made by other procedures such as alkylate made by the reaction of $C_4$ olefins and butanes using an acid catalyst, such as sulfuric acid or hydrofluoric acid.

Preferred gasolines are those having a Research Octane Number of at least 85. A more preferred Research Octane Number is 90 or greater. It is also preferred to blend the gasoline such that it has a content of aromatic hydrocarbons ranging from 10 to about 60 volume percent, an olefinic hydrocarbon content ranging from 0 to about 30 volume percent, and a saturate hydrocarbon content ranging from about 40 to 80 volume percent, based on the whole gasoline.

In order to obtain fuels having properties required by modern automotive engines, a blending procedure is generally followed by selecting appropriate blending stocks and blending them in suitable proportions. The required octane level is most readily accomplished by employing aromatics (e.g., BTX, catalytic reformate, or the like), alkylate (e.g., $C_{6-9}$ saturates made by reacting $C_4$ olefins with isobutane using a HF or $H_2SO_4$ catalyst), or blends of different types.

The balance of the whole fuel may be made up of other components such as other saturates, olefins, or the like. The olefins are generally formed by using such procedures as thermal cracking, catalytic cracking and polymerization. Dehydrogenation of paraffins to olefins can supplement the gaseous olefins occurring in the refinery to produce feed material for either polymerization or alkylation processes. The saturated gasoline components comprise paraffins and naphthenes. These saturates are obtained from (1) virgin gasoline by distillation (straight run gasoline), (2) alkylation processes (alkylates) and (3) isomerization procedures (conversion of normal paraffins to branched-chain paraffins of greater octane quality). Saturated gasoline components also occur in so-called natural gasoline. In addition to the foregoing, thermally cracked stocks, catalytically cracked stocks and catalytic reformates contain saturated components.

Utilization of non-hydrocarbon blending stocks or components in formulating the fuels used in this invention is feasible and, in some instances, may actually be desirable. Thus, use may be made of methanol, tertiary butanol and other inexpensive, abundant and non-deleterious oxygen-containing fuel components.

The normal gasoline may contain any of the other additives normally employed to give fuels of improved quality, such as tetraalkyllead antiknocks including tetramethyllead, tetraethyllead, mixed tetraethyltetramethyllead, and the like. They may also contain antiknock quantities of other agents such as cyclopentadienyl nickel nitrosyl, methylcyclopentadienyl manganese tricarbonyl, and N-methyl aniline, and the like. Antiknock promoters such as tert-butyl acetate may be included. Halohydrocarbon scavengers such as ethylene dichloride, ethylene dibromide and dibromo butane may be added. Phosphorus-containing additives such as tricresyl phosphate, methyl diphenyl phosphate, diphenyl methyl phosphate, trimethyl phosphate, and tris($\beta$-chloropropyl)phosphate may be present. Antioxidants such as 2,6-di-tert-butylphenol, 2,6-di-tert-butyl-p-cresol, phenylenediamines such as N-isopropylphenylene-diamine, and the like, may be present. Likewise, the gasoline can contain dyes, metal deactivators, or any of the additives recognized to serve some useful purpose in improving the gasoline quality.

The liquid hydrocarbon fuel of the lower gasoline boiling range, referred to as volatile fuel or condensate, is hydrocarbons having a final boiling point below that of normal gasoline. In the present invention it is not necessary to place an exact value on this final boiling point and, in fact, it can vary when the dual fuel system is used with different engines. The requirement is that the volatile fuel have a final boiling point low enough such that the particular engine to which the dual fuel system is connected will start and operate smoothly during warm-up without resorting to a richer air/fuel ratio than is required for operation at normal operating temperature. This is not to say that the use of a richer air/fuel ratio is excluded because under very cold conditions a slightly richer mixture may be required, especially to start the engine. This richer mixture is readily furnished by such means as choking the engine. However, the amount of time that the enriched air/fuel ratio is used will be substantially less than required without the dual fuel system of this invention and, accordingly, even when some choking is required, the overall exhaust emissions will be still greatly reduced by the use of the dual fuel system of this inveniton.

The optimum final boiling point for the volatile fuel to be used in the dual fuel system on a particular engine is best determined experimentally taking into account the conditions such as temperature and humidity, etc., under which the engine will be operated. A useful boiling range for the volatile fuel is from about 60°–300°F. Especially good results are obtained in most applications using a volatile fuel having a normal boiling range up to about 150°F. (ASTM D-86). The most preferred volatile fuel is made up of the light ends (low boilers) obtained from normal gasoline. In fact, further embodiments of this invention, to be described in detail hereafter, include in the dual liquid fuel system means for removing the light ends from normal gasoline and using these as the volatile fuel during start and warm-up.

In operation, starting with a cold engine, turning on the electrical ignition system automatically closes carburetor drain valve 30. Temperature responsive switch 29, sensing low engine temperature, signals fuel switching valve 5 to open the flow path for volatile condensate through conduit 24 and pressure regulating valve 25. Valve 25 functions to reduce the pressure of the condensate from the storage vessel pressure of up to 100 psig or more to a pressure that can be metered by the fuel bowl float actuated valve, e.g., 3–10 psig. Fuel bowl 7 fills with condensate from tank 20. The engine is started and operates on the condensate with little or no choking by choke valve 32. As engine temperature rises, switch 29 senses a temperature at which it has been determined the engine will operate satisfactorily on normal gasoline without the use of choke valve 32. It signals fuel switching valve 5 to close the fuel path from tank 20 through conduit 24 and open the flow path from gasoline tank 1 through gasoline conduit 2.

Liquid level actuated switch 21 in tank 20 senses a drop in the liquid level and signals pump 16 to operate. Pump 16 removes gasoline vapor from vaporizing chamber 11 and compresses it through finned-conduit 17 and one-way check valve 18 and conduit 19 into tank 20. The compressed vapor cools and condenses to form condensate which replenishes the supply in tank 20.

Pressure relief valve 22 is a safety feature which functions to relieve pressure in tank 20 at a safe level below its rated pressure capacity. Any vented volatiles are carried to gasoline tank 1 by conduit 23 and discharged below the liquid level such that they dissolve in the gasoline.

As the pressure drops in chamber 11 to a predetermined subatmospheric level (e.g., 1–14 psia), which depends on the volatility characteristics of the gasoline, pressure regulating valve 10 opens and meters gasoline from gas tank 1 through second gasoline conduit 9 into chamber 11 at a rate which maintains a substantially constant vacuum in chamber 11. Spray nozzle 33 disperses the entering gasoline into fine droplets which aids in the vaporization of the volatile portion.

In the preferred embodiment shown, the net volume of chamber 11 (i.e., the total volume less that occupied by tank 20 and its associated plumbing) is large enough so that it can contain the volatile-depleted gasoline resulting from the partial vaporization of sufficient gasoline to fill tank 20 and still provide adequate vaporizing space above the liquid level of the volatile-depleted gasoline in chamber 11. With most standard gasolines this is accomplished by having the volumetric capacity of tank 20 about 5–25 per cent of the net volumetric capacity of chamber 11.

When tank 20 is filled, liquid valve actuated switch 21 shuts off pump 16 and opens vent valve 13, thus relieving the vacuum in chamber 11 with gasoline vapor from the upper vapor zone in gasoline tank 1. In an optional arrangement, a liquid sensor is placed in conduit 23 between tank 20 and pressure relief valve 22 which functions by stopping operation of pump 16 and opening vent valve 13 whenever liquid condensate enters conduit 23. This would occur when tank 20 is full of condensate. As the engine continues to operate, normal gasoline will be delivered to the engine from gasoline tank 1 through conduit 2 and also volatile-depleted gasoline will be delivered from chamber 11 through one-way check valve 27 and drain conduit 26. This serves to consume the volatile-depleted gasoline immediately following each operation of the "on board" volatile fuel regeneration system. When the liquid level in chamber 11 drops to a predetermined level, float valve 34 closes to prevent air from entering gasoline conduit 2. Optionally, float valve 34 and valve 3 can be interlocked such that when valve 34 is open, valve 3 remains closed, and when valve 34 closes, valve 3 opens. In this manner, the engine would use volatile-depleted gasoline exclusively when it is at full operating temperature and thus ensure that this fuel is consumed prior to any requirement to again operate the on board fuel regeneration system.

When the engine is shut off, carburetor drain valve 30, responsive to the electrical ignition system, opens, draining fuel bowl 7. Fuel switching valve 5 remains in the position closing condensate conduit 24 at all times when the engine is shut off to prevent condensate from entering fuel bowl 7 when drain valve 30 is open. Optionally, an additional valve can be placed in conduit 24 which is interlocked with valve 30 such that it closes whenever valve 30 opens.

A main feature of the invention is the placement of tank 20 within chamber 11 which provides a safety factor in case any leak should develop in pressure tank 20. Escaping volatile fuel would be contained within chamber 11 and dissolved in the volatile-depleted fuel therein. Also, excellent heat transfer is provided from the condensate to the fuel in the vaporizing chamber.

Another key feature is the sizing of chamber 11 in relation to tank 20. For example, if the system is adjusted to vaporize a 10 volume per cent portion of the gasoline entering chamber 11, then tank 20 would be 10 per cent or less of the net working volume in chamber 11. This assures that tank 20 will fill before chamber 11 becomes so full of volatile-depleted fuel that it can no longer function efficiently as a vaporizer. In other words, the system provides ample capacity in the vaporizing chamber to contain the volatile-depleted fuel left over after removing a sufficient amount of volatiles to fill the pressure storage vessel with volatile condensate and still provide space for vaporization.

A further important feature is the venting of vaporizing chamber 11 after each use which enables the volatile-depleted gasoline therein to drain by gravity back into the normal gasoline supply system, thus eliminating the necessity of pumping the volatile-depleted fuel from the vaporizing chamber.

I claim:

1. A fuel system for an internal combustion engine comprising a gasoline source, a vaporizing chamber, means for delivering said gasoline to said vaporizing chamber, means for removing vapors from said vaporizing chamber, means for condensing said vapors to form condensate, means for delivering said condensate to a closed storage tank, said closed storage tank being completely within said vaporizing chamber and sealed from said vaporizing chamber, and means for delivering said condensate from said closed storage tank to the fuel induction system of said internal combustion engine.

2. The fuel system of claim 1 including fuel switching means adapted to deliver said condensate to said fuel induction system during selected periods of engine operation and to deliver said gasoline to said fuel induction system during the remaining period of engine operation.

3. The fuel system of claim 1 wherein the volumetric capacity of said closed storage tank is from about 5 to 25 per cent of the net volumetric capacity of said vaporizing chamber.

4. The fuel system of claim 3 wherein said means for removing vapors comprises pump means adapted to compress said vapors into said condensing means.

5. The fuel system of claim 4 including fuel switching means adapted to deliver said condensate to said fuel induction system during selected periods of engine operation and to deliver said gasoline to said fuel induction system during the remaining period of engine operation.

6. A fuel system of claim 2 comprising a gasoline tank connected by a gasoline conduit through said fuel switching means to the fuel inlet of a carburetor of an internal combustion engine adapted to deliver gasoline to said fuel inlet during selected periods of engine operation, a second gasoline conduit connecting said gasoline tank through pressure regulating means to said vaporizing chamber adapted to deliver gasoline to said chamber at a rate sufficient to maintain a predetermined vacuum in said chamber, a vapor conduit connecting said chamber to a pump adapted to pump volatile gasoline vapor from said chamber and to compress said vapor into a conduit which connects said pump to said closed storage tank located within said chamber, said closed storage tank being connected by a condensate conduit through said fuel switching means to said fuel inlet of said carburetor and adapted to deliver said condensate to said fuel inlet during selected periods of engine operation.

7. The fuel system of claim 6 wherein the volumetric capacity of said closed storage tank is from about 5–25 per cent of the net volumetric capacity of said chamber.

8. The fuel system of claim 7 wherein said chamber is connected through a vent valve to a venting area adapted to relieve the vacuum in said chamber when said pump is not operating and a drain conduit connecting said chamber through a drain valve to said gasoline conduit adapted to drain the volatile-depleted gasoline from said chamber to said gasoline conduit when the vacuum in said chamber is relieved.

9. The fuel system of claim 8 having a pressure relief conduit from said closed storage tank to a second vent area and a pressure relief valve in said pressure relief conduit.

10. A fuel system for an internal combustion engine comprising a fuel tank, said fuel tank comprising an outer housing forming a chamber adapted to contain gasoline having a volatile fraction thereof removed and an inner closed housing forming an inner tank completely within and sealed from said chamber adapted to contain said volatile fraction, means for removing said volatile fraction from gasoline in said chamber and means for delivering said volatile fraction from said inner tank to said engine.

11. A fuel system for an internal combustion engine comprising a normal gasoline source, a fuel tank, said fuel tank comprising an outer housing forming a chamber adapted to contain gasoline having a volatile fraction thereof removed and an inner closed housing forming an inner tank completely within and sealed from said chamber adapted to contain said volatile fraction, means for removing said volatile fraction from gasoline in said chamber, means for delivering said volatile fraction from said inner tank to said engine during selected periods of engine operation, and means for delivering said normal gasoline to said engine during the remaining period of engine operation.

12. A fuel system of claim 11 including fuel switching means adapted to deliver said volatile fraction to said engine during selected periods of engine operation and to deliver said normal gasoline to said engine during the remaining period of engine operation.

13. A fuel system for an internal combustion engine, said fuel system comprising a gasoline tank, a vaporizing chamber, a vapor conduit connecting said chamber to a pump adapted to pump volatile gasoline vapors from said chamber and to compress said vapors into a conduit which connects said pump to a closed storage tank located completely within said chamber, said closed storage tank being connected by a condensate conduit through fuel switching means to a fuel inlet of a carburetor of said engine, said fuel switching means being adapted to deliver said condensate to said fuel inlet during selected periods of engine operation and to deliver said gasoline to said fuel inlet during the remaining period of engine operation, means for condensing said vapors to form said condensate, said gasoline tank being connected by a gasoline conduit through said fuel switching means to said fuel inlet of said carburetor, a second gasoline conduit connecting said gasoline tank through pressure regulating means to said vaporizing chamber adapted to deliver gasoline to said vaporizing chamber at a rate sufficient to maintain a predetermined vacuum in said chamber, said vaporizing chamber being connected through a vent valve to a venting area located in the top vapor area inside said gasoline tank adapted to relieve the vacuum in said chamber when said pump is not operating, and a drain conduit connecting said chamber through a drain valve to said gasoline conduit adapted to drain the volatile-depleted gasoline from said chamber to said gasoline conduit when the vacuum in said chamber is relieved.

* * * * *